(12) United States Patent
Sakai

(10) Patent No.: US 6,502,462 B2
(45) Date of Patent: Jan. 7, 2003

(54) CAPACITANCE TYPE DYNAMIC QUANTITY SENSOR HAVING DISPLACEMENT PORTION AND FORMED BY WIRE BONDING

(75) Inventor: Minekazu Sakai, Kariya (JP)

(73) Assignee: Denso Corporation, Kariya (JP)

( * ) Notice: Subject to any disclaimer, the term of this patent is extended or adjusted under 35 U.S.C. 154(b) by 6 days.

(21) Appl. No.: 09/880,778

(22) Filed: Jun. 15, 2001

(65) Prior Publication Data

US 2002/0000124 A1 Jan. 3, 2002

(30) Foreign Application Priority Data

Jun. 26, 2000 (JP) ......................................... 2000-191536

(51) Int. Cl.[7] ........................................... G01P 15/125
(52) U.S. Cl. .................................................. 73/514.32
(58) Field of Search ...................... 73/514.32, 504.12, 73/504.14, 514.36, 514.38

(56) References Cited

U.S. PATENT DOCUMENTS

| | | | |
|---|---|---|---|
| 5,723,353 A | 3/1998 | Muenzel et al. | |
| 5,880,369 A | 3/1999 | Samuels et al. | |
| 5,959,208 A | 9/1999 | Muenzel et al. | |
| 6,055,858 A | 5/2000 | Muenzel et al. | |
| 6,065,341 A | 5/2000 | Ishio et al. | |

FOREIGN PATENT DOCUMENTS

JP 11-344507 12/1999

Primary Examiner—Richard A. Moller
(74) Attorney, Agent, or Firm—Law Offices of David G. Posz

(57) ABSTRACT

In a capacitance type dynamic quantity sensor, a movable electrode is connected to a support substrate through a frame shaped displacement portion. The displacement portion is composed of first and second beams and a beam connection part connecting the first and second beams at ends thereof. The support substrate has electrode pads for wire bonding involving vibration. The first and second beams can perform flexural vibration at a natural frequency with the beam connection part working as a free end. The shape of the beam connection part is adjusted so that the natural frequency at the flexural vibration is different from that of the vibration applied by the wire bonding.

8 Claims, 4 Drawing Sheets

CAPACITANCE TYPE DYNAMIC QUANTITY SENSOR HAVING DISPLACEMENT PORTION AND FORMED BY WIRE BONDING

CROSS REFERENCE TO RELATED APPLICATION

This application is based upon and claims the benefit of Japanese Patent Application No. 2000-191536 filed on Jun. 26, 2000, the contents of which are incorporated herein by reference.

BACKGROUND OF THE INVENTION

1. Field of the Invention

This invention relates to a capacitance type dynamic quantity sensor having a movable electrode and a fixed electrode for detecting a dynamic quantity applied thereto based on a change in capacitance between the movable electrode and the fixed electrode.

2. Description of the Related Art

JP-A-11-326365 proposes a capacitance type dynamic quantity sensor. The dynamic quantity sensor has a displacement portion (spring portion) connected to a support substrate (semiconductor substrate), a movable electrode connected to the displacement portion to be moved together with the displacement portion, and a fixed electrode provided facing the movable electrode.

The displacement portion is composed of a first beam connected to and supported by the support substrate at a middle part thereof, a second beam provided separately from and in parallel with the first beam, and connection parts connecting both ends of the first and second beams, thereby forming a frame shape. The movable electrode is connected to a middle part of the second beam, and is displaceable together with the second beam.

The support substrate is formed with electrode pads that are electrically connected to the movable electrode and the fixed electrode. Generally, the electrode pads are connected to an external circuit by wire bonding.

For example, when a dynamic quantity such as acceleration is applied to the dynamic quantity sensor, the first and second beams of the displacement portion perform detecting vibration with the connection part as a fixed end that extends perpendicularly to the longitudinal direction of the beams. The movable electrode is then displaced in accordance with the detecting vibration to change a capacitance between the movable electrode and the fixed electrode. The dynamic quantity is detected based on this change in capacitance.

SUMMARY OF THE INVENTION

However, according to studies and experiments by the inventors, it is revealed that the conventional dynamic quantity sensor described above has the following problem. That is, when wire bonding is performed to the electrode pads, the wire bonding involves vibration so that the vibration is applied to the displacement portion. If the frequency of the wire bonding coincides with the natural frequency of the beams of the displacement portion, the beams of the displacement portion may resonate so that the connection part hits against a peripheral portion thereof. This can result in damage to the displacement portion.

To solve this problem, it is conceivable that the natural frequency of the first and second beams is controlled not to coincide with the frequency of the vibration of the wire bonding. In this case, however, vibration characteristics of the displacement portion for detecting the dynamic quantity would also be changed at a practical usage.

The present invention has been made in view of the above problem. An object of the present invention is to restrain a displacement portion of a capacitance type dynamic quantity sensor from being damaged by wire bonding while securing vibration characteristics of the displacement portion for detecting dynamic quantity.

According to the present invention, a displacement portion of a capacitance type dynamic quantity sensor is composed of a first beam connected to a support substrate, a second beam provided separately from and in parallel with the first beam and connected to a movable electrode, and a beam connection part connecting the first and second beams at ends thereof. The first and second beams perform detecting vibration with the beam connection part working as a fixed end in a direction perpendicular to a longitudinal direction of the displacement portion, when a dynamic quantity is applied to the displacement portion. The first and second beams further can perform flexural vibration to bend in an identical direction with the beam connection part working as a free end. A shape of the beam connection part is adjusted so that a natural frequency of the displacement portion at the flexural vibration is different from a frequency of vibration that is applied to the displacement portion by wire bonding.

The present invention is based on a finding that the displacement portion performs vibrations (detecting vibration and flexural vibration) different from each other at a practical operation for detecting the dynamic quantity and at the wire bonding. The shape adjustment of the beam connection part hardly affects the first and second beams that dominate vibration characteristics for detecting the dynamic quantity. Therefore, the displacement portion can be prevented from being damaged by the wire bonding while securing the vibration characteristics for detection.

BRIEF DESCRIPTION OF THE DRAWINGS

Other objects and features of the present invention will become more readily apparent from a better understanding of the preferred embodiments described below with reference to the following drawings, in which.

DETAILED DESCRIPTION OF THE PREFERRED EMBODIMENT

A preferred embodiment according to the present invention is explained below referring to appended drawings. In the embodiment, the present invention is applied to a differential capacitance type semiconductor acceleration sensor 100 shown in FIGS. 1 and 2 adopted as a capacitance type dynamic quantity sensor. The semiconductor acceleration sensor 100 is applicable to, for example, an acceleration sensor and a gyro sensor for vehicles for controlling operations of air bag, ABS, VSC systems and the like.

Figure 1:
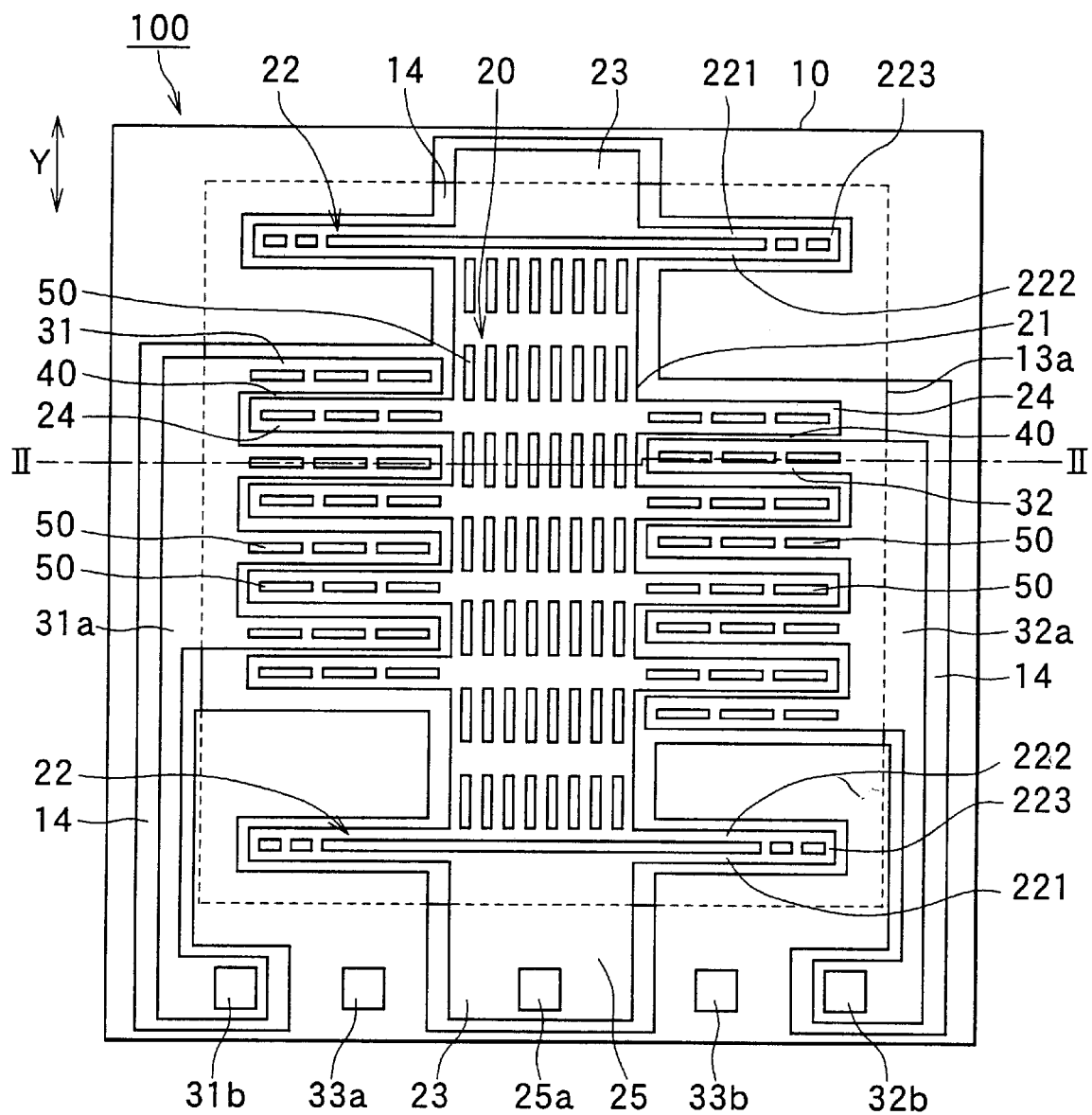
FIG. 1 is a plan view showing a semiconductor acceleration sensor according to a preferred embodiment of the present invention.
Figure 2:
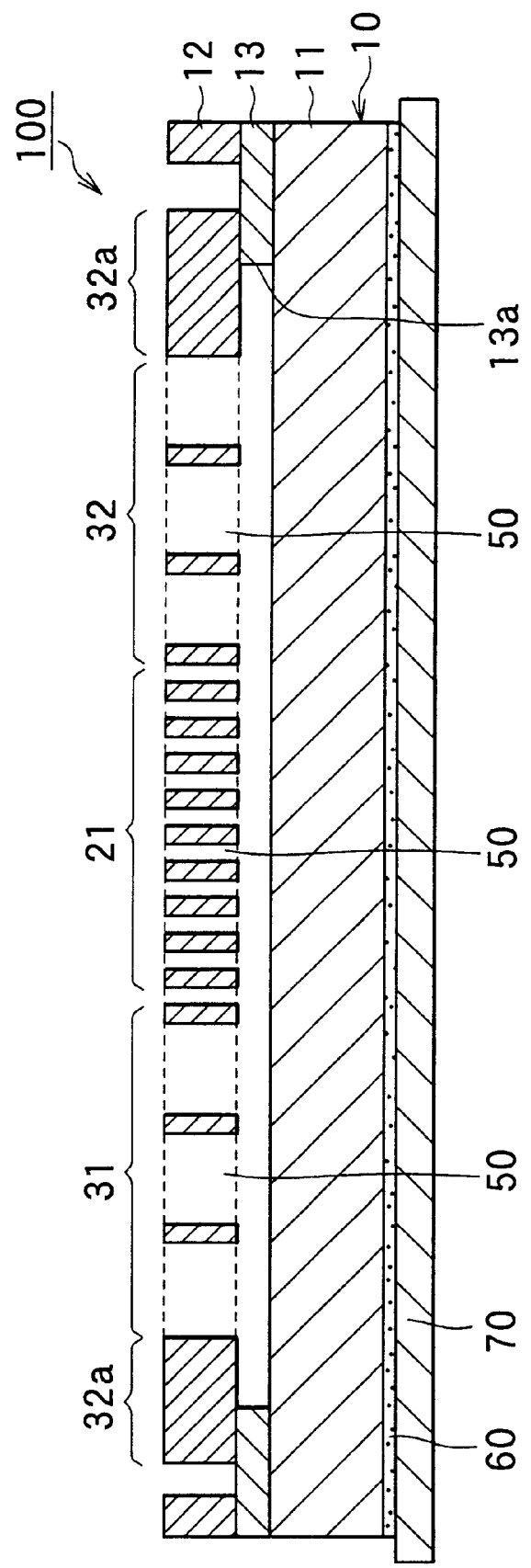
FIG. 2 is a cross-sectional view taken along line II—II in FIG. 1.

Referring to FIGS. 1 and 2, the sensor 100 is formed by performing micro-machine processes. A semiconductor substrate constituting the sensor 100 is, as shown in FIG. 2, an SOI substrate (support substrate) 10 that is composed of a first silicon substrate 11 as a first semiconductor layer, a second silicon substrate 12 as a second semiconductor layer, and an oxide film 13 as an insulation layer interposed between the first and second silicon substrates 11 and 12.

A movable electrode 20 as a movable portion and fixed electrodes 31, 32 facing the movable electrode 20 through grooves 14 are provided on the second silicon substrate 12. A rectangular opening portion 13a is formed in the oxide film 13 by sacrificial layer etching or the like at a region corresponding to the beam structure 20, 31, 32. The movable electrode 20 is provided across the opening portion 13a, and has a rectangular weight portion 21, both ends of which are integrally connected to anchor portions 23 through displacement portions 22. Both anchor portions 23 are fixed to edges of the opening portion 13a of the oxide film 13, and are supported on the first silicon substrate 11. Thus, the weight portion 21 and the displacement portions 22 face the opening portion 13a.

Figure 3:
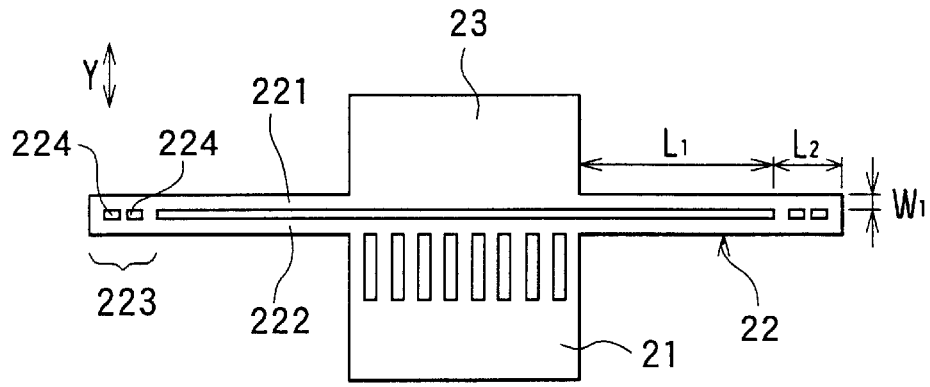
FIG. 3 is an enlarged view showing a vicinity of a displacement portion shown in FIG. 1.

Here, FIG. 3 is an enlarged view showing the vicinity of one of the displacement portions 22 in FIG. 1. Each displacement portion 22 has a rectangular frame shape, and is composed of first and second beams 221, 222 that are disposed separately from and in parallel with each other and are identical in size and shape. The displacement portion 22 further has. beam connection parts 223 connecting the first and second beams 221, 222 at both ends thereof. The first beam 221 is connected to and supported by the SOI substrate (support substrate) 10 at a middle part in the longitudinal direction thereof. The second beam 222 is connected to the weight portion 21 of the movable electrode, 20 at a middle part in the longitudinal direction thereof.

Figure 4A:
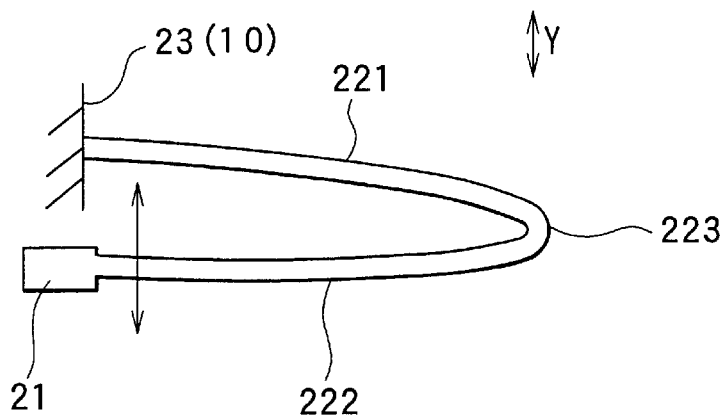
FIGS. 4A and 4B are explanatory views for explaining vibration modes of the displacement portion.

The displacement portion 22 has a spring function to be displaced in direction Y indicated by arrows Y in FIGS. 1 and 3 perpendicular to the longitudinal direction of the beams 221, 222. Specifically, as schematically shown in FIG. 4A, when the sensor 100 receives acceleration involving a component in direction y, the first and second beams 221, 222 vibrate (oscillate) with the beam connection part 223 as a fixed end so as to approach each other and to be separated from each other (detecting vibration mode). Thus, the weight portion 21 can be displaced at the detecting vibration mode in response to application of the acceleration.

Further, plural electrode members 24 are integrally formed with both sides of the weight portion 21 parallel to the direction Y. The electrode members 24 protrude from the respective sides perpendicularly to the direction Y and in opposed directions to one another, and form a comb-like shape at the respective sides.

The fixed electrodes 31, 32 are provided to engage with the comb-like shaped electrode members 24 like teeth at both sides of the weight portion 21 interposed therebetween. The fixed electrodes 31, 32 are supported by the first silicon substrate 11 via the oxide film 13 at the edges of the opening portion 13a.

More specifically, each of the fixed electrodes 31, 32 has several (four in the figure) electrode members, each of which has a bar (beam) shape with a rectangle in cross-section and is cantilevered by the first silicon substrate 11 to face the opening portion 13a. Each electrode member of the fixed electrodes 31, 32 is disposed with a side face opposed to a corresponding one of the electrode members 24 with a predetermined interval (detection interval) 40. The electrode members of the fixed electrodes 31, 32 are provided in parallel with the electrode members 24 of the movable electrode 20.

Hereinafter, in the fixed electrodes 31, 32, the left side one in FIG. 1 is referred to as a first fixed electrode 31 and the right side one in FIG. 1 is referred to as a second fixed electrode 32. The first and second fixed electrodes 31, 32 are electrically independent of each other, and respectively electrically communicate with wiring portions 31a, 32a formed on the second silicon substrate 12.

Fixed electrode pads 31b, 32b are respectively provided on predetermined regions of the wiring portions 31a, 32a, for wire bonding. On the other hand, a movable electrode wiring portion 25 is provided in a state where it is integrally connected to one of the anchor portions 23, and a movable electrode pad 25a is provided on a predetermined region of the wiring portion 25, for wire bonding. The movable electrode 20 and the fixed electrodes 31, 32 are electrically connected to the outside through these pads 25a, 31b, and 32b.

In FIG. 1, the respective pads 25a, 31b, 32b are electrically independent of each other. Further, electrode pads 33a, 33b are provided on the second silicon substrate 12. The electrode pads 33a, 33b keep the second silicon substrate 12 at the periphery of the displacement portion 22 having a given electrical potential, thereby preventing an unnecessary signal from being applied to the movable electrode 20 during the operation of the sensor 100. The respective electrode pads 25a, 31b, 32b, 33a, 33b are made of, for example, aluminum.

The weight portion 21, the electrode members 24, and the fixed electrodes 31, 32 have plural rectangular through holes 50 penetrating from the side of the opening portion 31a to an opposite side thereof, so that a rigid-frame structure provided as a combination of plural rectangular frame parts is attained by the through holes 50. Accordingly, the movable electrode 20 and the fixed electrodes 31, 32 are lightened, and those torsional strengths are improved.

Also as shown in FIG. 2, the back surface of the first silicon substrate 11 (the surface at an opposite side of the oxide film 13) is bonded to a package 70 through adhesive 60. A circuit unit (detection circuit) 80 described below is accommodated in the package 70. The circuit unit 80 is electrically connected to the respective electrode pads 25a, 31b, 32b, 33a, 33b by wire bonding using wires (not shown) made of gold or aluminum.

In the structure as described above, a first capacitance (CS1) is provided in the detection interval 40 defined between the first fixed electrode 31 and the electrode members 24, and a second capacitance (CS2) is provided in the detection interval 40 between the second fixed electrode 32 and the electrode members 24. Upon receiving acceleration, the movable electrode 20 vibrates at the detecting vibration mode and is displaced as a whole in the direction Y. At that time, the detection interval 40 changes in accordance with the displacement of the movable electrode 20 to change the capacitances CS1, CS2. Then, the detection circuit 80 detects the acceleration based on a differential capacitance (CS1–CS2) caused by the electrode members 24 and the fixed electrodes 31, 32.

Figure 5:
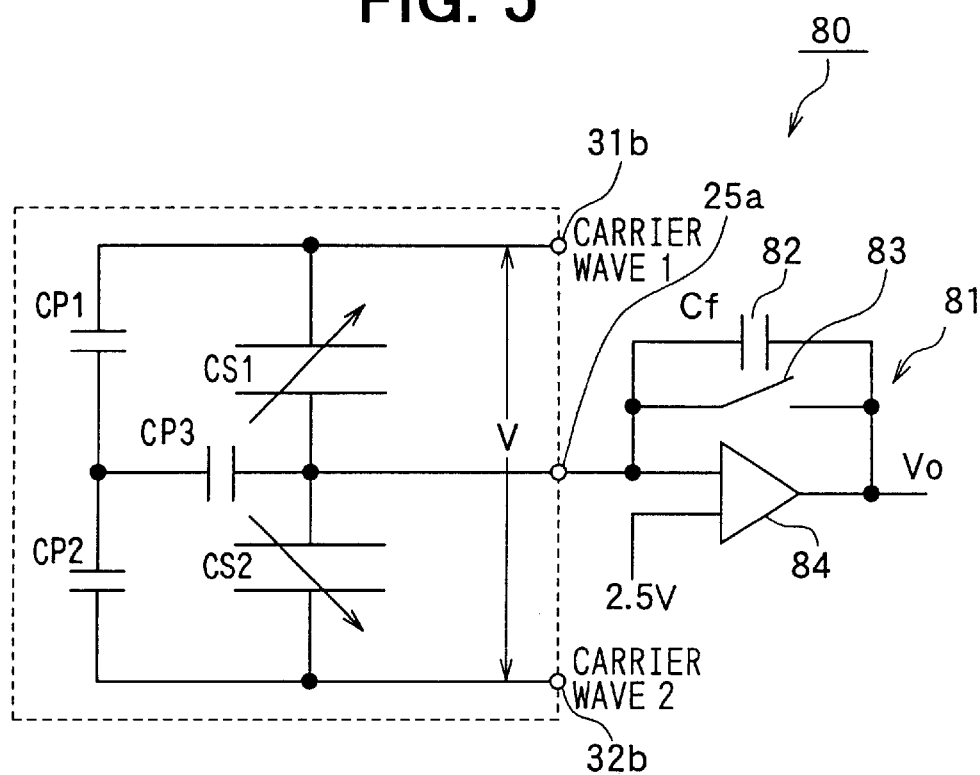
FIG. 5 is a circuit diagram showing a detection circuit of the semiconductor acceleration sensor shown in FIG. 1.

FIG. 5 shows the circuitry of the detection circuit 80 in the present sensor 100. The detecting circuit 80 has a switched capacitor circuit (SC circuit) 81. The SC circuit 81 is composed of a capacitor 82 having capacitance Cf, a switch 83, and a differential amplifier 84, and converts a difference in capacitance (CS1−CS2) inputted therein into a voltage.

Figure 6:
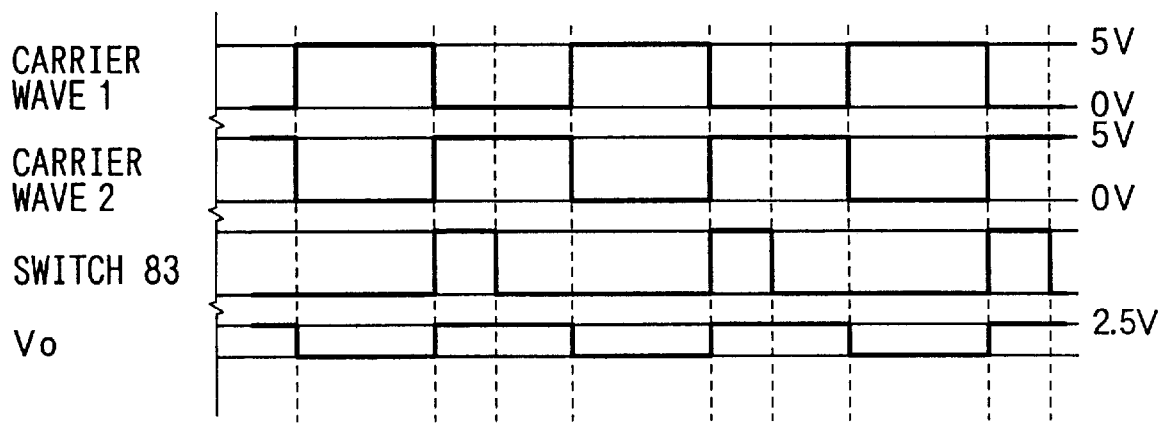
FIG. 6 is a timing chart with respect to the detection circuit shown in FIG. 5.

Incidentally, CP1, CP2, CP3 represent parasitic capacitances, respectively. CP1 is a capacitance between the wiring portion 31a of the first fixed electrode 31 and the first silicon substrate 11, CP2 is a capacitance between the wiring portion 32a of the second fixed electrode 32 and the first silicon substrate 11, and CP3 is a capacitance between the wiring portion 25 of the movable electrodes 24 and the first silicon substrate FIG. 6 shows, as an example, a timing chart with respect to the detection circuit 80. In the sensor 100, for example, carrier wave 1 (frequency: 100 kHz, amplitude: 0–5V) is inputted through the fixed electrode pad 31b, while carrier wave 2 (frequency: 100 kHz, amplitude: 0–5V), a phase of which is shifted from that of the carrier wave 1 at 180°, is inputted through the fixed electrode pad 32b. Then, the switch 83 of the SC circuit 81 is opened and closed at the timings shown in the chart. The applied acceleration is then outputted as voltage $V_0$ represented by formula (1):

$$V_0 = \{(CS1-CS2)+(CP1-CP2)\cdot CP3\}\cdot V/Cf \tag{1}$$

In the formula (1), V is a difference in voltage between the pads 31b and 32b.

The above-described sensor 100 is manufactured by wire-bonding the above-described circuit unit 80 to the respective pads 25a, 31b, 32b, 33a, and 33b after the beam structure 20, 31, 32 is formed on the SOI substrate 10 using well-known semiconductor manufacture techniques.

When the wire bonding is performed, vibration of the wire bonding is applied to the displacement portion 22. In the present embodiment, in order to restrict the displacement portion 22 from being damaged during the wire bonding by hitting against the peripheral portion which the displacement portion 22 faces through the groove 14, the shape of the beam connection part 223 is adjusted so that the natural frequency of the beams 221, 222 of the displacement portion 22 is different from that of the vibration of the wire bonding.

Specifically, as a result of studies and experiments, it is revealed that the vibration mode of the displacement portion 22 at the practical operation (detecting vibration) is different from that at the wire bonding. At the practical operation, the displacement portion 22 vibrates with the beam connection part 223 as a fixed end so that the first and second beams 221, 222 approach and come away from each other (see FIG. 4A, detecting vibration mode).

Figure 4B:
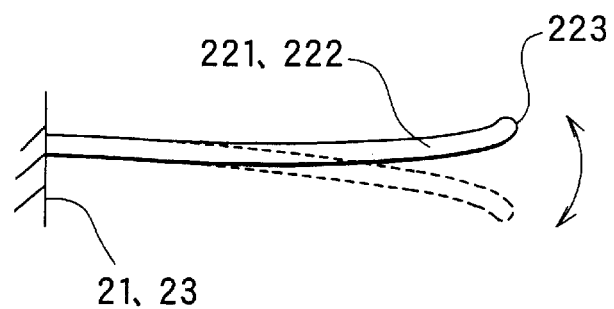

On the other hand, at the wire bonding, as shown in FIG. 4B, the displacement portion 22 performs flexural vibration at which the first and second beams 221, 222 bend in an identical direction with the beam connection part 223 as a free end, and a connection part between the first beam 221 and the anchor portion 23 (connection part wit h the support substrate) and a connection part between the second beam 222 and the weight portion 21 (connection part with the movable electrode) as a fixed end. This is referred to as a flexural vibration mode.

In these two vibration modes, when the spring constant of the beams 221, 222 is K and a mass of the vibration body is M, the natural frequency of the beams 221, 222 constituting the displacement portion 22 is determined by $(K/M)^{1/2}$. Further, spring constants $K_1$, $K_2$ of the first and second beams 221, 222 at the detecting vibration mode and the flexural vibration mode are represented by the following formulas (2) and (3):

$$K_1 = (2\cdot E\cdot h\cdot W_1^3)/L_1^3 \tag{2}$$

$$K_2 = (E\cdot h\cdot W_1^3)/4\cdot(L_1+L_2^3) \tag{3}$$

In the formulas (2) and (3), referring to FIG. 3, $L_1$ is each length of the beams 221, 222 in the longitudinal direction thereof, $W_1$ is each width of the beams 221, 222, and $L_2$ is a length of the beam connection part 223. Further, h is each thickness of the beams 221, 222 (approximately the same as that of the beam connection part 223), and E is a Young's modulus of the beams 221, 222.

In the displacement portion of the capacitance type dynamic quantity sensor, generally, because the length $L_2$ of the beam connection part is smaller than the length $L_1$ of each beam, the sparing constant $K_2$ at the flexural vibration mode is smaller than (about one tenth of) the spring constant $K_1$ at the detecting vibration mode according to the formulas (2), (3).

Also, at the detecting vibration mode, the mass M of the vibration body is derived not only from the displacement portion 22 but also from the movable electrode 20 that is significantly heavier than the displacement portion 22. As opposed to this, at the flexural vibration mode, the mass M is derived substantially only from the displacement portion 22. Therefore, not the difference in spring constant K but the difference in mass M of the vibration body dominates the difference in natural frequency of the beams at both the detecting vibration mode and the flexural vibration mode.

Because of this, the natural frequency $\omega_1$ of the beams at the flexural vibration mode is larger than (about ten times of) the natural frequency $\omega_2$ of the beams at the detecting vibration. For example, the natural frequency $\omega_1$ is in a range of 0 to about 10 kHz, and the natural frequency $\omega_2$ is larger than several dozen kHz. Thus, for example, whether the frequency coincides with the high frequency (60 kHz or 120 kHz) of the wire bonding depends on the natural frequency $\omega_2$ of the beams at the flexural vibration mode.

From the view of these points, in the present embodiment, the natural frequency $\omega_2$ at the flexural vibration is made different from the frequency applied by the wire bonding, and the displacement portion 22 is so constructed that it does not resonate during the wire bonding and so that the detecting characteristics can be secured at the detecting vibration during the practical operation.

That is, according to the present embodiment, the shape of the beam connection part 223 is controlled so that the natural frequency $\omega_2$ at the flexural vibration is different from the frequency applied by the wire bonding. Because this is attained simply by adjusting the shape of the beam connection part 223, which works as a fixed end at the detecting vibration (practical operation), this shape adjustment of the beam connection part 223 hardly affects the first and second beams 221, 222 that mainly dominate the detecting vibration characteristics. As a result, the vibration characteristics can be desirably exhibited during the practical operation of the displacement portion 22.

Further, because the natural frequency $\omega_2$ of the displacement portion 22 at the flexural vibration is different from the frequency applied by the wire bonding, the displacement portion 22 can be prevented from resonating at the flexural vibration mode due to the vibration of the wire bonding, and the beam connection part 223 can be prevented from hitting against the peripheral portion thereof. Therefore, the damage of the displacement portion 22 can be prevented at the wire bonding, while the vibration characteristics of the displacement portion 22 can be exhibited during the practical operation.

When the frequency applied by the wire bonding is represented as $\omega_0$ the natural frequency $\omega_2$ of the displacement portion 22 at the flexural vibration preferably falls in a range determined by relationships of $\omega_2 \leq (2-2^{2/1})\omega_0$, and $2^{2/1}\omega_0 \leq \omega_2$. This is because it is general in a field regarding vibration that natural frequency $\omega$ of an vibration body is set to be equal to or lower than $(2-2^{2/1})\omega$, and equal to or larger than $2^{2/1}\omega$ in order to prevent the vibration body from resonating by the natural frequency $\omega$.

Specifically, the shape adjustment of the beam connection part 223 can be done by controlling at least one of the length $L_2$ of the beam connection part 223 in the longitudinal direction of the displacement portion 22, and the weight of the beam connection part 223. Accordingly, the length, $L_1+L_2$, which is a length between the fixed end to the free end, can be controlled at the flexural vibration without changing the length $L_1$ of the first and second beams 221, 222. Thus, the natural frequency $\omega_2$ at the flexural vibration can be controlled easily without changing the natural frequency $\omega_1$ at the detecting vibration, so that the vibration characteristics of the displacement portion 22 can be secured during the practical operation. For example, increasing the length $L_2$ of the beam connection part 223 increases the entire length, $L_1+L_2$, of the displacement portion 22, and lowers the natural frequency $\omega_2$ at the flexural vibration mode.

In the sensor 100 according to the present embodiment, parameters of the displacement portion 22 are, for example, as follows. Regarding the first and second beams 221, 222, the Young's modulus E is about $1.7 \times 10^{11}$ Pa, the thickness h is about 15 $\mu$m, the width $W_1$ is about 4 $\mu$m, and the length $L_1$ is about 290 $\mu$m. Further, the length $L_2$ of the beam connection part is about 18 $\mu$m.

Also, in the sensor 100, the beam connection part 223 optionally can have through holes 224 that are formed by partially removing the beam connection part 23. The through holes 224 penetrate the second silicon substrate 12 in the thickness direction thereof similarly to the through holes 225, and the number of the through holes 224 is two for each beam connection part 223 in the figures. The reason why the through holes 224 are provided is below.

At the flexural vibration of the displacement portion 22, the weight of the beam connection part 223 that works as a free end hardly affects the vibration at a relatively high frequency (for example, about 100 kHz); however, the weight affects the vibration in a case where the vibration has a relatively low frequency (for example, about 50 kHz).

In the later case, the heavier the beam connection part 223 is, the larger the amplitude of the flexural vibration is. Therefore, there is a possibility that the beam connection part 223 hits against the peripheral portion facing the part 223 through the groove 14 if the amplitude becomes excessively large. On the contrary, when the through holes 224 are formed in the beam connection part 223, the beam connection part 223 can be lightened, so that the above problem can be avoided.

In addition, when the beam connection part 223 has at least one (two in the figure) through hole 224, the first and second beams 221, 222 are connected by at least two (three in the figure) bars (beams). Inconsequence, the rigidity of the beam connection part 223 is enhanced as compared to the case where the beams 221, 222 are connected by only one bar (where there is no through hole 224).

At the practical operation, stress always acts on the beam connection part 223 working as a fixed end. Therefore, if the rigidity of the beam connection part 223 is insufficient, the beam connection part 223 may be deformed in a shifted direction shifted from the direction Y (sensitivity axis direction), and sensitivity can easily, arises in the shifted direction (another axis sensitivity). Therefore, it is preferable to increase the rigidity of the beam connection part as in the present embodiment.

The present embodiment is not limited to the semiconductor acceleration sensor 100 as described above, but may be applied to various dynamic quantity sensors such as pressure sensors and yaw rate sensors, provided that the sensor detects a dynamic quantity based on a change in capacitance between a movable electrode and a fixed electrode and the sensor has a rectangular shaped displacement portion including two beams connected by a beam connection part for displacing the movable electrode.

While the present invention has been shown and described with reference to the foregoing preferred embodiment, it will be apparent to those skilled in the art that changes in form and detail may be made therein without departing from the scope of the invention as defined in the appended claims.

What is claimed is:

1. A capacitance type dynamic quantity sensor comprising:
    a support substrate;
    a displacement portion composed of a first beam connected to the support substrate, a second beam provided separately from and in parallel with the first beam, and a beam connection part connecting the first beam and the second beam at ends thereof, the first beam, the second beam and the beam connection part forming a frame shape;
    a movable electrode connected to the second beam and suspended above the support substrate;
    a fixed electrode fixed to the support substrate and facing the movable electrode defining an interval therebetween; and
    first and second electrode pads provided on the support substrate to be electrically connected to an outside circuit by wire bonding for electrically connecting the movable electrode and the fixed electrode to the outside circuit, wherein:
    the first and second beams of the displacement portion perform detecting vibration with the beam connection part working as a fixed end in a direction perpendicular to a longitudinal direction of the displacement portion, when a dynamic quantity is applied to the displacement portion, so that the movable electrode is displaced to detect the dynamic quantity based on a change in capacitance between the movable electrode and the fixed electrode;
    the first and second beams can perform flexural vibration to bend in an identical direction with the beam connection part working as a free end, and with connection parts between the first beam and the support substrate and between the second beam and the movable electrode working as a fixed end; and
    a shape of the beam connection part is adjusted so that a natural frequency of the displacement portion at the flexural vibration is different from a frequency of vibration that is applied to the displacement portion by the wire bonding.

2. The capacitance type dynamic quantity sensor according to claim 1, wherein the natural frequency of the displacement portion at the flexural vibration is equal to or smaller than $(2-2^{2/1})\omega_0$, and equal to or larger than $2^{2/1}\omega_0$ in which $\omega_0$ is the frequency of the vibration applied by the wire bonding.

3. The capacitance type dynamic quantity sensor according to claim 1, wherein:

the first beam is connected to the support substrate at a middle part in the longitudinal direction of the displacement portion; and the second beam is connected to the movable electrode at a middle part in the longitudinal direction.

4. The capacitance type dynamic quantity sensor according to claim 1, wherein the shape of the beam connection part is adjusted by adjusting a length of the beam connection part in the longitudinal direction.

5. The capacitance type dynamic quantity sensor according to claim 1, wherein the beam connection part has a through hole.

6. A capacitance type dynamic quantity sensor comprising:

a support substrate;

a displacement portion composed of a first beam connected to the support substrate, a second beam provided separately from and in parallel with the first beam, and a beam connection part connecting the first beam and the second beam at ends thereof, the first beam, the second beam and the beam connection part forming a frame shape;

a movable electrode connected to the second beam and suspended above the support substrate;

a fixed electrode fixed to the support substrate and facing the movable electrode defining an interval therebetween; and first and second electrode pads provided on the support substrate to be electrically connected to an outside circuit by wire bonding for electrically connecting the movable electrode and the fixed electrode to the outside circuit, the wire bonding producing vibration that is applied to the displacement portion, wherein:

the first and second beams of the displacement portion perform detecting vibration at a detecting vibration mode with the beam connection part working as a fixed end in a direction perpendicular to a longitudinal direction of the displacement portion, when a dynamic quantity is applied to the displacement portion;

the first and second beams can perform flexural vibration at a flexural vibration mode to bend in an identical direction with the beam connection part working as a free end; and a shape of the beam connection part is adjusted to prevent the displacement portion from resonating at the flexural vibration mode due to the vibration applied to the displacement portion by the wire bonding.

7. The capacitance type dynamic quantity sensor according to claim 6, wherein the shape of the beam connection part is adjusted by adjusting a length of the beam connection part in the longitudinal direction.

8. The capacitance type dynamic quantity sensor according to claim 6, wherein the beam connection part has a through hole.

* * * * *